United States Patent
Everest

(10) Patent No.: US 12,547,655 B1
(45) Date of Patent: Feb. 10, 2026

(54) METHOD AND APPARATUS FOR ADAPTIVE CONTENT GENERATION

(71) Applicant: edYou Technologies Inc., Los Angeles, CA (US)

(72) Inventor: Michael Everest, Los Angeles, CA (US)

(73) Assignee: edYou Technologies Inc., Los Angeles, CA (US)

( * ) Notice: Subject to any disclaimer, the term of this patent is extended or adjusted under 35 U.S.C. 154(b) by 0 days.

(21) Appl. No.: 19/232,488

(22) Filed: Jun. 9, 2025

(51) Int. Cl.
G06F 16/353 (2025.01)
G06F 16/335 (2019.01)

(52) U.S. Cl.
CPC .......... G06F 16/353 (2019.01); G06F 16/337 (2019.01)

(58) Field of Classification Search
None
See application file for complete search history.

(56) References Cited

U.S. PATENT DOCUMENTS

| | | | | |
|---|---|---|---|---|
| 7,016,828 | B1 * | 3/2006 | Coyne | G06F 40/106 704/9 |
| 10,198,428 | B2 * | 2/2019 | Bryant | G06F 40/10 |
| 2011/0010163 | A1 * | 1/2011 | Jansen | G06F 40/211 704/9 |
| 2016/0171096 | A1 * | 6/2016 | Seow | G06N 3/0895 707/738 |
| 2019/0228065 | A1 * | 7/2019 | Lavallee | G06F 40/30 |
| 2019/0339968 | A1 * | 11/2019 | Gupta | G06F 8/30 |
| 2021/0089725 | A1 * | 3/2021 | Andreev | G06F 40/58 |
| 2023/0394241 | A1 * | 12/2023 | Xia | G06F 11/00 |
| 2024/0378397 | A1 | 11/2024 | Liu | |

FOREIGN PATENT DOCUMENTS

DE 202024107653 U1 1/2025

* cited by examiner

*Primary Examiner* — Christopher J Raab
(74) *Attorney, Agent, or Firm* — Caldwell Intellectual Property Law

(57) ABSTRACT

An apparatus for adaptive content generation includes a processor configured to receive input data, retrieve a user associated data file as a function of the input data, generate a linguistic profile as a function of the user associated data file and the at least one learning task by extracting one or more linguistic identifiers within the user associated data file, modify, using a natural language processing (NLP) model, the user associated data file to create a modified user associated data file, modify a graphical user interface comprising one or more display elements associated with the modified user associated data file, and transmit the graphical user interface to the remote device.

20 Claims, 8 Drawing Sheets

METHOD AND APPARATUS FOR ADAPTIVE CONTENT GENERATION

FIELD OF THE INVENTION

The present invention generally relates to the field of machine learning. In particular, the present invention is directed to method and an apparatus for adaptive content generation.

BACKGROUND

In a typical electronic reading environment, users who encounter unfamiliar terms may rely on embedded dictionary features that the user has to actively access, which may display definitions in pop-up windows that obscure the text or may redirect the user to an entirely different view. These features disrupt the flow of reading and offer only generic definitions. They also make it incumbent on the user to identify words or phrases the user may need assistance in comprehending.

SUMMARY OF THE DISCLOSURE

In an aspect, an apparatus for adaptive content generation includes at least a circuitry and a memory communicatively connected to at least a processor. The memory contains instructions configuring the at least a processor to receive input data, retrieve a user associated data file as a function of the input data, generate a linguistic profile as a function of the user associated data file and the at least one learning task by extracting one or more linguistic identifiers within the user associated data file, modify, using a natural language processing (NLP) model, the user associated data file to create a modified user associated data file, wherein modifying the user associated data file includes identifying, using a machine learning module, a plurality of linguistic elements within the user associated data file, classifying, using a machine learning module, the plurality of linguistic elements to a plurality of complexity categorizations, and modifying, using a machine learning module, one or more linguistic elements of the plurality of linguistic elements from one or more complexity categorizations of the plurality of complexity categorizations as a function of the linguistic profile, modify a graphical user interface comprising one or more display elements associated with the modified user associated data file, and transmit the graphical user interface to the remote device.

In another aspect, a method for adaptive content generation is described. The method includes receiving input data, retrieving a user associated data file as a function of the input data, generating a linguistic profile as a function of the user associated data file and the at least one learning task by extracting one or more linguistic identifiers within the user associated data file, modifying, using a natural language processing (NLP) model, the user associated data file to create a modified user associated data file, wherein modifying the user associated data file includes identifying, using a machine learning module, a plurality of linguistic elements within the user associated data file, classifying, using a machine learning module, the plurality of linguistic elements to a plurality of complexity categorizations, and modifying, using a machine learning module, one or more linguistic elements of the plurality of linguistic elements from one or more complexity categorizations of the plurality of complexity categorizations as a function of the linguistic profile, modifying a graphical user interface comprising one or more display elements associated with the modified user associated data file, and transmitting the graphical user interface to the remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for adaptive content generation. The apparatus includes at least a circuitry comprised of a processor and a memory communicatively connected to the processor. The memory instructs the processor to receive input data. The processor retrieves a user associated data file as a function of the input data. The processor generates a linguistic profile as a function of the user associated data file and the at least one learning task by extracting one or more linguistic identifiers within the user associated data file. The processor modifies, using a natural language processing (NLP) model, the user associated data file to create a modified user associated data file. The processor generates a graphical user interface comprising one or more display elements associated with the modified user associated data file. The processor transmits the graphical user interface to the remote device.

Figure 1:
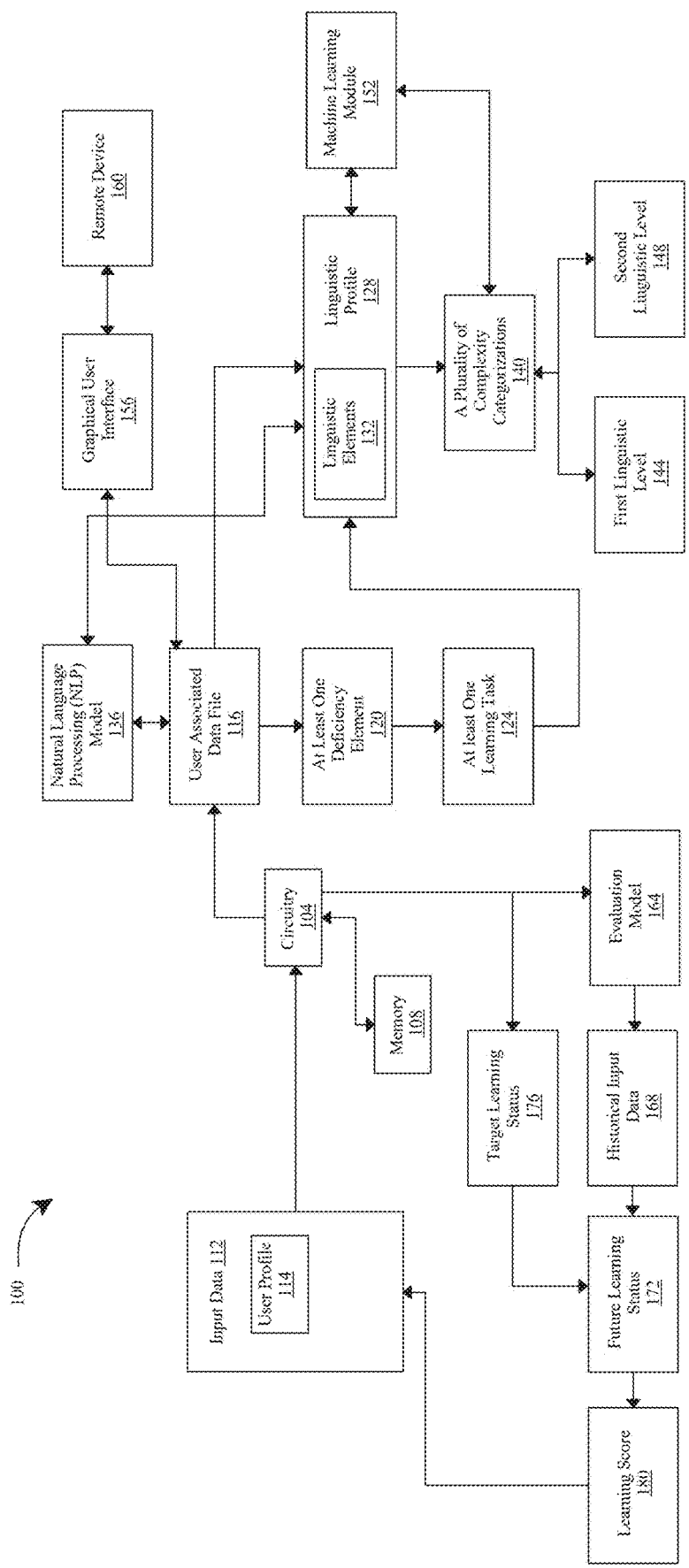
FIG. 1 is a block diagram of an apparatus for adaptive content generation.

Referring now to FIG. 1, an exemplary embodiment of apparatus 100 for adaptive content generation is illustrated. Apparatus 100 may include circuitry such as without limitation a processor 104 communicatively connected to a memory 108; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory 108 may be attached thereto to further configure the hardware unit using read-only memory (ROM) or any other static or writable memory as described in this disclosure. Alternatively or additionally, hardware units and/or modules may be combined with and/or in communication with a processor 104, such as without limitation in a system-on-chip architecture wherein some functions are configured by modification or design of hardware circuitry, such as without limitation FPGA circuitry, while others are configured in the form of instructions in memory 108 for one or more processors 104. As a non-limiting example, any step or combination of steps described herein may be performed entirely using hardware circuit configured to perform such steps with static memory or rewritable memory. Such steps or combinations of steps may include signing with a digital signature, cryptographically hashing, evaluation of zero-knowledge proofs, or any other specific process described in this disclosure.

With continued reference to FIG. 1, circuitry may be designed and/or configured to perform any method, method step, or sequence of method steps in any embodiment described in this disclosure, in any order and with any degree of repetition. For instance, circuitry may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. circuitry may perform any step or sequence of steps as described in this disclosure in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to receive input data 112. An "input data," as used in this disclosure, is data provided to the apparatus 100 for processing, analysis, or computation. Input data 112 may include raw, processed, structured, and/or unstructured information originating from various sources such as user interactions, sensors, databases, or external systems. The nature and format of input data 112 may vary depending on the specific requirements of the apparatus 100 or process utilizing it. In an embodiment, input data 112 may include various types of information to enhance the functionality and adaptability of the apparatus 100. Without limitation, the input data 112 may include textual input, audio input, video input, and the like. In one or more embodiments, input data 112 may include user questions, which may enable the apparatus 100 to process and generate contextually relevant outputs. In one or more embodiments, input data 112 may include textual input, such as typed commands or written content, allowing the apparatus 100 to analyze and respond accordingly. In one or more embodiments, input data 112 may include audio input, enabling voice commands, spoken questions, or other sound-based interactions to be processed through speech recognition or audio analysis technologies. In one or more embodiments, Input data 112 may also include audio input. The audio input may further extend the versatility of the input data 112 by allowing visual content, such as live video feeds or pre-recorded clips, to be analyzed for features like object recognition, motion detection, or user interaction cues. In one or more embodiment, the input data 112 may be integrated into the 100 apparatus to enhance user engagement. In one or more embodiments, input data 112 may include a first input data. In one or more embodiments, a first input data 112 may include one or more data elements of a user profile 114. In one or more embodiments, a user profile 114 may include details such as preferences, past interactions, and demographic information to tailor the apparatus 100 responses or behavior.

With continued reference to FIG. 1, a "user profile," as used in this disclosure, is any information pertaining to a user. In one or more embodiments, input data 112 may include user profile 114 specific to a particular user, such as the current individual interacting with apparatus 100. In one or more embodiments, user profile 114 may include but is not limited to, the age of the user, the geographical location of the user, the gender of the user and the like. In one or more embodiments, user profile 114 may include the educational background of a user, such as but not limited to, school attended, schools graduated, grades associated with the educational courses that the user attended, current educational courses the user is in, upcoming educational courses the user will be attending, previous exams taken, grades associated with previous exams taken, and the like. In one or more embodiments, user profile 114 may include information associated with previous interactions a user had with apparatus 100. Previous interactions may include, but are not limited to, inputs made by the user, outputs generated by apparatus 100 as a function of user inputs, and the like. In one or more embodiments, user profile 114 may include a dialect spoken by user. In one or more embodiments, user profile 114 may include words not understood by the user. In one or more embodiments, user profile 114 may include educational topics that a user is proficient in, and/or educational topics that a user is lacking. In one or more embodiments, user profile 114 may include preferences in which a user desires to receive outputs from apparatus 100. For example, user profile 114 may include a preference to receive outputs in a question-and-answer format, outputs in a multiple-choice format and the like. At least a processor 104 may be further configured to log a user interaction with the modified user associated data file, wherein logging a user interaction includes capturing a user response time with one or more display elements of the graphical user interface. In one or more embodiments, user profile 114 may include system-generated metrics or logs derived from user interaction with apparatus 100. For example and without limitation, user interaction may include an amount of time a user spends interacting with specific content, such as a digital book or an educational task, a duration the user spends viewing or attempting to interpret a particular word or phrase, and timestamps associated with user activity. In one or more embodiments, apparatus 100 may monitor how long a user remains on a given reading passage or question, or how frequently a user revisits certain types of educational content. In one or more embodiments, user profile 114 may include a record of prior user queries or requests for assistance. For example and without limitation, user profile 114 may store a list of words or phrases a user has previously asked for help with, a types of definitions or explanations selected, and how often a user re-engages with the same word or topic. In one or more embodiments, interaction based data points may be used to determine a complexity level or linguistic level for a user.

With continued reference to FIG. 1, In one or more embodiments, input data 112 may be used to personalize or optimize the functionality of the apparatus. Input data 112 may include measurable or observable factors, as well as inferred or contextual information, relevant to the operation or objectives of the apparatus. For example, without limitation, input data 112 may include a user's age, reading comprehension level, learning obstacles, emotional state/mood, and the like. Without limitation, input data 112 may be used by the apparatus to adapt instructional materials, tailor feedback, or adjust the pacing of content delivery. In one or more embodiments, input data 112 may also include other user specific details such as preferences, prior knowledge, or performance metrics, enabling the apparatus to provide a more effective and personalized experience.

With continued reference to FIG. 1, in a non-limiting example, user profile 114 may be consistent with one or more aspects of the user data described in U.S. patent application Ser. No. 18/122,340, filed on Mar. 16, 2023, titled "APPARATUS AND METHOD FOR GENERATING AN EDUCATIONAL ACTION DATUM USING MACHINE-LEARNING," which is incorporated by reference herein in its entirety.

With continued reference to FIG. 1, processor 104 is configured to retrieve a user associated data file 116 as a function of the input data 112. A "user associated data file," as used in this disclosure, is any form of content with which a user may interact through apparatus. In one or more embodiments, a user associated data file 116 may include but are not limited to educational, instructional, recreational, or informational materials. In one or more embodiments, a user associated data file 116 may be user-selected, user-generated, or retrieved from a remote sources. In one or more embodiments, a user associated data file 116 may include digital text documents, electronic books (eBooks), webpages, images, audio-visual media, presentations, interactive quizzes, annotated diagrams, flashcards, or mixed-media instructional materials. In one or more embodiments, a user associated data file 116 may include XML-based documents, HTML contents, or tagged data formats. In one or more embodiments, a user associated data file 116 may include scanned documents, photographs of printed materials, or handwriting input captured via touchscreens or styluses. In one or more embodiments, a user associated data file 116 may include a file formats. For example, and without limitation, file formats may include PDF, EPUB, HTML, JPEG, PNG, DOCX, MP4 and other commonly used multimedia and document formats. In one or more embodiments, a user associated data file 116 may include a learning content. A "learning content," as used in this disclosure, is any educational or instructional material intended to facilitate acquisition of knowledge by a user. In one or more embodiments, at least a learning content may include a wide range of subject matter. In one or more embodiments, at least a learning content may include a wide range of difficulty levels. In one or more embodiments, at least a learning content may include early childhood education (e.g., Pre-K and elementary-level literacy or numeracy). In one or more embodiments, at least a learning content may include secondary education (e.g., middle school and high school curricula aligned with standardized benchmarks). In one or more embodiments, at least a learning content may include post-secondary education (e.g., college-level coursework or textbooks). In one or more embodiments, at least a learning content may include vocational or professional training materials (e.g., continuing education programs, industry certification, or corporate onboarding content). In one or more embodiments, at least a learning content may include one or more external sources, including but not limited to commercially available textbooks, open educational resources (OER), publisher-issued electronic content, academic literature, public domain works, standardized testing materials, government-issued electronic content, peer-reviewed journal articles.

With continued reference to FIG. 1, In one or more embodiments, user associated data file 116 may be used to personalize or optimize the functionality of the apparatus. User associated data file 116 may include measurable or observable factors, as well as inferred or contextual information, relevant to the operation or objectives of the apparatus. For example, without limitation, user associated data file 116 may include a user's age, reading comprehension level, learning obstacles, emotional state/mood, and the like. Without limitation, user associated data file 116 may be used by the apparatus to adapt instructional materials, tailor feedback, or adjust the pacing of content delivery. In one or more embodiments, user associated data file 116 may also include other user specific details such as preferences, prior knowledge, or performance metrics, enabling the apparatus to provide a more effective and personalized experience. In a non-limiting example, user associated data file 116 may include specific characteristics tailored to individual users interacting with the apparatus. For instance, if the user is a 5-year-old, user associated data file 116 such as age, reading comprehension level, and developmental stage may be used to present simplified language, colorful visuals, and engaging activities to maintain attention and enhance learning. Conversely, if the user is a 25-year-old, user associated data file 116 may indicate a higher reading comprehension level, allowing the apparatus to present detailed explanations, in-depth examples, and optional advanced challenges to promote critical thinking. Without limitation, for a user with learning disabilities, user associated data file 116 captured during the user profile 114 setup may include accommodations or specific challenges, such as difficulty with reading or processing information. In one or more embodiments, apparatus may use the user associated data file 116 to enable accessibility features, such as text-to-speech functionality, larger font sizes, simplified content structure, and the like to ensure an inclusive learning experience tailored to the users' needs. In a non-limiting example, user associated data file 116 may include a user's mood. Without limitation, the user's mood may be extracted by analyzing virtual behavior within the software, external activities on other websites, or environmental inputs captured by the computing device or downstream device. For instance, within the apparatus, the user's mood may be inferred from patterns such as the speed or frequency of user interactions, hesitation or repeated attempts on questions, deviations from typical engagement levels, and the like. In one or more embodiments, a user who rapidly skips questions or exits learning content early may exhibit signs of frustration or distraction, prompting the apparatus to offer encouraging messages, simplified content, or a break recommendation. Outside the software, user associated data file 116 may be enriched by observing external behaviors such as browsing activity or social media engagement. For example, without limitation, if the user has been visiting websites related to stress relief or has posted content indicating fatigue or anxiety, the apparatus may interpret this as a potential shift in mood and adjust its interactions by providing more supportive and empathetic responses or lighter learning tasks. In another embodiment, user associated data file 116 related to mood may also be derived from environmental sounds captured by the computing device or downstream device. For instance, without limitation, sighs, changes in tone or volume during verbal inputs, or exclamations may indicate frustration, excitement, or confusion. The apparatus may process these auditory cues to assess the user's emotional state and tailor its outputs accordingly. For example, if the apparatus detects signs of frustration, it may provide motivational feedback, reduce the difficulty of tasks, or suggest calming activities. Continuing, these examples demonstrate how the apparatus may leverage diverse inputs to assess and respond dynamically to a user's mood, enhancing the overall user experience.

With continued reference to FIG. 1, at least a processor 104 may be configured to classify the user associated data file 116 to at least one learning task 124 of at least one learning task 124. A "learning task," as used in this disclosure, is any activity that engages a user in processing, interpreting, or generating information. In one or more embodiments, at least one learning task 124 may include task associated to cognitive domain (e.g., Bloom's taxonomy (remembering, understanding, applying, analyzing, evaluating, and creating)), to modality (e.g., visual, auditory, textual), or to skill area (e.g., reading, writing, speaking, listening, critical thinking). In one or more embodiments, at least one learning task 124 may include reading-based task. In one or more embodiments, at least one learning task 124 may include text comprehension and semantic breakdown task such as identifying key vocabulary words, generating summaries based on reading, answering embedded or user-generated comprehension questions, highlighting contextually important text segments. In one or more embodiments, at least one learning task 124 may include writing tasks such as brainstorming ideas, generating outlines, and drafting essays or open-ended responses. In one or more embodiments, at least one learning task 124 may include speech tasks, such as reading aloud from a learning content, practicing pronunciation, or engaging in oral repetition or conversational drills. In one or more embodiments, at least one learning task 124 may include multi-modal instructional interactions that combine elements of reading, writing, and speaking. In one or more embodiments, at least one learning task 124 may include engaging in a quiz activity, receiving assistance in essay writing, generating an outline, or requesting a modified version of a user associated data file 116 tailored to a user's proficiency level or preference. In one or more embodiments, at least one learning task 124 may be selected or inferred based on input data 112, including prior user behavior, detected deficiencies, or interaction patterns. In one or more embodiments, a user may explicitly indicate a desired learning task to apparatus 100. In one or more embodiments, a user may request comprehension questions for a text passage form at least one learning task 124 through apparatus 100. In one or more embodiments, a user may request vocabulary reinforcement exercises from at least one learning task 124 through apparatus 100.

With continued reference to FIG. 1, at least a processor 104 may be configured to classify the user associated data file 116 to at least one learning task 124 of at least one learning task 124 by identifying at least one deficiency element 120 within the user associated data file 116. Identifying the at least one deficiency element 120 may include identifying one or more linguistic elements 132 within the user associated data file 116, comparing one or more linguistic elements 132 to one or more learning parameters, and determining a performance gap as a function of the at least one deficiency element 120. In one or more embodiments, identifying the at least one deficiency element 120 may include detecting one deficiency element based on comparison of the user associated data file 116 to one or more learning parameters. A "deficiency element," as used in this disclosure, is any instructional deviation, error, omission, or performance gap that is indicative of a user's difficulty in acquiring a particular knowledge component relative to one or more predefined learning parameters. In one or more embodiments, at least one deficiency element 120 may be detected by comparing features derived from the user associated data file 116 to system-defined correctness criteria, instructional benchmarks, model answers, or idealize task outcomes. In one or more embodiments, at least one deficiency element 120 may include a reading comprehension deficiency. For example, a reading comprehension deficiency may include but not limited to a user's inability to correctly answer questions based on a reading passage, a user's failure to identify key themes or vocabulary, a user's excessive reliance on external help (e.g., text-to-speech playback or dictionary lookup) during a reading task. In one or more embodiments, at least one deficiency element 120 may include a pronunciation deficiency element. For example, without limitation, a pronunciation deficiency element may be identified based on speech input that diverges from phonetic or prosodic norms associated with a target language. In one or more embodiments, at least one deficiency element 120 may include writing deficiency. For example, and without limitations, a writing deficiency may include grammatical errors, syntactic inconsistencies, or coherence issues when compared against model compositions or rubric-based expectations.

With continued reference to FIG. 1, a "learning parameter," as used in this disclosure, is any system-defined, empirically derived, or dynamically generated criteria against which user performance is evaluated. In one or more embodiments, one or more learning parameters may represent target knowledge benchmarks, expected skill proficiency levels, or ideal output patterns associated with a given learning task. In one or more embodiments, one or more learning parameters may be derived from standardized sources such as testing scoring rubrics, curriculum-aligned answer keys, performance metrics obtained from educational assessments tools, or normative database that reflect aggregate proficiency levels across a given age group, grade level, or academic domain. In one or more embodiments, one or more learning parameters may be personalized, incorporating individual input data such as prior task history, demonstrated proficiency, learning pace, or estimated cognitive ability. For example, and without limitation, user response time, error correction behavior, and attention patterns may be analyzed to infer executive function metrics that serve as learning parameters including the classification of task difficulty and deficiency identification. In one or more embodiments, one or more learning parameters may be adaptive in response to evolving educational standards, pedagogical frameworks, or observed system-wide trends. For example, and without limitation, apparatus may retrieve or infer updated learning parameters from external data source such as education research datasets, national curriculum databases, or institutional performance benchmarks.

With continued reference to FIG. 1, "classifying" or a "classification" is any act of categorizing or classifying the input data based on the attributes. Classification may involve the use of algorithms, rules, or models to analyze data and determine the most appropriate classification as described in more detail herein. For example, without limitation, a classification may involve training a model, such as the classifier, to identify a user's skill level (e.g., beginner, intermediate, or advanced) based on their performance on quizzes or activities. In one or more embodiments, a classification may include a machine learning module 152 trained on labeled training data that includes user inputs. In one or more embodiments, training data may include, without limitation, historical user interaction data, assessment scores, error logs, behavioral patterns, and manually annotated examples collected from one or more prior users or sessions. In one or more embodiments, the training data may be derived from previously logged input data 112 and user associated data file 116, including user responses, feedback, and task performance records. In one or more embodiments, a classification may use supervised learning techniques such as logistic regression, decision trees, support vector machines, or neural networks to learn associations between user behaviors and predefined classification labels. Similarly, the classification may apply to categorizing images, text, or audio into specific groups, such as recognizing handwritten digits or identifying the sentiment of a given sentence. The process of classification may enable the classifier or apparatus to make decisions, provide tailored outputs, and/or organize data, such as input data 112, efficiently based on its assigned categories. In one or more embodiments, the processor 104 may identify and extract key linguistic indicators from an input data 112 or user associated data file 116. For example, and without limitation, key linguistic works may correspond to higher-order learning outcomes (e.g., "analyze," "synthesize," or "evaluate") or lower-order terms (e.g., "define," "list," or "recognize"). In one or more embodiments, a classification may process user-generated inputs or selections, such as checkboxes, tags, or highlighted content, to infer learning preferences, deficiencies, or task goals. For example, and without limitation, a classification may determine whether a user requested vocabulary review, grammar correction, or content summarization, and use the request to refine task-level classification. In a non-limiting example, classification may include users grouped into learning profiles based on their preferred study methods. For instance, the classifier may classify a user as a "visual learner" if they frequently interact with diagrams, charts, or videos, or as an "auditory learner" if they prefer listening to audio explanations. Continuing, by classifying users into the classifications, the apparatus may provide content, or user specific output in formats that align with the users learning style, such as presenting material as infographics for visual learners or offering narrated summaries for auditory learners. Another example of possible classifications may include categorizing users based on the type of errors they commonly make. For instance, a user may be classified as prone to "conceptual errors" if they consistently misunderstand the underlying principles of a subject, or as prone to "calculation errors" if they frequently make mistakes in basic arithmetic. This classification may allow the apparatus to customize feedback or the user specific output by addressing the specific weaknesses of the user, such as offering additional conceptual tutorials for the former or providing practice exercises to enhance accuracy for the latter. Without limitation, these targeted approaches may enhance the personalization and effectiveness of the learning experience.

With continued reference to FIG. 1, processor 104 is configured to generate a linguistic profile 128 as a function of the user associated data file 116 and the at least one learning task 124 by extracting one or more linguistic identifiers within the user associated data file 116. A "linguistic profile," as used in this disclosure, is any structured data representation characterizing a user's language-related competencies. In one or more embodiments, a linguistic profile 128 may include language-related competencies, behaviors and interaction patterns derived though analysis of textual, spoken, or multimodal input. In one or more embodiments, a linguistic profile 128 may include metrics or indicators pertaining to vocabulary range, syntactic complexity, semantic comprehension, fluency, grammatical accuracy, or usage patterns. In one or more embodiments, a linguistic profile 128 may be tailored to the context of a specific learning task or instructional objective. In one or more embodiments, a linguistic profile 128 may have user-specific characteristics such as reading habits. For example, reading habits include but are not limited to a fast reader, a slow reader, or exhibits frequent rereading behavior, which may be inferred through temporal analysis of user interactions with digital text, such as scrolling velocity, page duration, or frequency of annotation or clarification requests. In one or more embodiments, a linguistic profile 128 may indicate a user's linguistic proficiency level, which may be categorized along a hierarchical scale (e.g., basic, intermediate, advanced) or aligned with standardized language frameworks such as CEFR (Common European Framework of Reference for Languages) or other benchmark taxonomies. In one or more embodiments, a linguistic profile 128 may incorporate learning intent including whether a user's objective is general literacy development, standardized test preparation, academic language acquisition, professional vocabulary building, or second language fluency. In one or more embodiments, a linguistic profile 128 may include learning task preference or historical performance data.

With continued reference to FIG. 1, a "linguistic identifier," as used in this disclosure, is any data element that is derived from user-associated content and is indicative of a user's linguistic characteristics, language usage, or communication patterns. In one or more embodiments, a linguistic identifier may include a quantifiable or classifiable representation of textual, phonetic, syntactic, semantic, or discourse-level features that may be extracted using natural language processing (NLP), speech recognition, or machine learning models. In one or more embodiments, a linguistic identifier may be used to facilitate downstream processing operations such as user profiling, task classification, content adaptation, performance evaluation, or learning outcome prediction. In one or more embodiments, a linguistic identifier may include lexical feature. For example, and without limitation, a lexical feature may include word frequency, type-token ratio, vocabulary diversity, or domain-specific terminology usage. In one or more embodiments, a linguistic identifier may include syntactic feature. For example, and without limitation, a syntactic feature may include sentence length, part-of-speech (POS) tag distributions, syntactic tree depth, or frequency of specific grammatical structures (e.g., passive voice, complex clauses). In one or more embodiments, a linguistic identifier may include semantic feature. For example, and without limitation, a semantic feature may include keyword relevance, topic modeling vectors, semantic similarity scores, or embedding representations derived from pretrained language models (e.g., BERT, GPT). In one or more embodiments, a linguistic identifier may include phonetic or prosodic features. For example, and without limitation, phonetic or prosodic feature may be extracted from spoken user input, including pronunciation confidence scores, phoneme accuracy, speech rate, and intonation patterns. In one or more embodiments, a linguistic identifier may be expressed as a feature vector suitable for input to machine learning classifiers, clustering algorithms, or regression models used to determine user proficiency, detect deficiency elements, or predict performance trends.

With continued reference to FIG. 1, processor 104 is configured to modify, using a natural language processing (NPL) model, the user associated data file 116 to create a modified user associated data file. As used in this disclosure, a "natural language processing (NLP) model" refers to a component designed to analyze, interpret, and process human language in its natural form. For instance, the NLP model 136 may receive as input various types of data including, but not limited to, text data or auditory data. A natural language processor may utilize techniques from computational linguistics, artificial intelligence, and machine learning to understand the structure, meaning, and context of language and generate appropriate responses or actions based on the input. In one or more embodiments, the NLP model 136 may comprise or include a machine learning model trained to refine its responses and outputs based on user feedback and interaction history. In one or more embodiments, a machine learning model may be trained using labeled training data that includes user queries, associated learning content, and feedback signals such as whether a modified explanation was too easy, too complex, or appropriately matched to the user's comprehension level. In one or more embodiments, a training process may be iterative, allowing the NLP model 136 to continuously adapt and improve over time by incorporating performance indicators and content adjustment outcomes. For example, and without limitation, the NLP model 136 may parse a user associated data file 116 such as "what does the author mean by this paragraph?" to identify the central topic and the type of comprehension challenge. The NLP model 136 may then retrieve or generate a simplified explanation, a contextual summary, or a vocabulary aid to support a user's understanding. For example, and without limitation, the NLP model 136 may analyze spoken commands or reading aloud input such as "Read this page to me" or "Highlight difficult words," converting the audio to text, detecting user intent, and executing appropriate modifications or instructional feedback. In one or more embodiments, the NLP model 136 may enable apparatus 100 to engage in intuitive and effective learning interactions with users by interpreting natural language inputs from reading sessions and producing relevant, context-aware outputs. In one or more embodiments, the user profile 114 may contain individualized information such as reading preferences, cognitive style (e.g., visual, or auditory learner), proficiency level, or past performance, while one or more classifications assigned to the input may identify the content domain, difficulty level, or intent of the user associated data file 116. By incorporating these elements, the processor 104 may dynamically tailor the modified user associated data file to generate user-specific output aligned with the user's unique needs and the context of the learning content. For example, without limitation, if a input data 112 is a query such as "What does 'melancholy' mean in this sentence?," and the user profile 114 indicates a beginner-level ready, the NLP model 136 may return a simplified dictionary definition, a sentence-level paraphrase, and an example of the learning content. In one or more embodiments, if a user profile 114 indicates a preference for visual learning, apparatus may provide a pictorial presentation or short video clip illustrating the term's meaning in context.

With continued reference to FIG. 1, an NPL model may include a large language model. A "large language model," as used herein, is a deep learning data structure that can recognize, summarize, translate, predict, and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, nonlimiting examples, textbooks, academic articles, lesson plans, quizzes, practice problems, student communications, teacher feedback, educational videos, and related content and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data 112. In the case of natural language processing, input data 112 may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data 112 is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with input data 112.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, in one or more embodiments, if a user profile 114 indicates that a user is experiencing frustration by detecting indicators such as repeated rereading, frequent clarification request or genitive sentiment in spoken queries, circuitry may adjust the return output to include emotional support elements. For example, without limitation, if a user asks, "Why is this chapter so confusing?" the NLP model 136 may simplify the summary, break down key plot points, and append an encouraging message like "Do not worry. Let us go through this together step by step." In one or more embodiments, if user associate data file indicates a user is highly engaged, by detecting fast reading progression, rich annotation activity, or positive auditory signals such as enthusiastic tone or laughter, the return output may be enriched with additional content. For exam and without limitations, upon encountering a passage about a historical event or fictional scenario, the NLP model 136 may suggest a short article, an interactive timeline, or a discussion prompt such as "How would you react if you were the character in this chapter?" In one or more embodiments, the NLP model 136 may include a celebratory element as output such as "Great progress! You just finished chapter 3. Keep going!" As a reinforce motivation.

With continued reference to FIG. 1, modifying the user associated data file 116 include identifying, using a machine learning module 152, a plurality of linguistic elements 132 within the user associated data file 116 and classifying, using a machine learning module 152, the plurality of linguistic elements 132 to a plurality of complexity categorizations 140 wherein the plurality of complexity categorization may include a first linguistic level 144 and a second linguistic level 148, wherein the first linguistic level 144 and the second linguistic level 148 may be associated with one or more learning parameter and modifying one or more linguistic elements 132 of the plurality of linguistic elements 132 from a plurality of complexity categorizations 140 of the plurality of complexity categorizations 140 as a function of the linguistic profile. Classifying the plurality of linguistic elements 132 to a plurality of complexity categorizations 140 may include analyzing syntactic complexity to generate the linguistic profile. In one or more embodiments, analyzing syntactic complexity may include analyzing a syntactic complexity of each linguistic element of the plurality of linguistic elements 132 within the user associated data file 116; and classifying each linguistic element of the plurality of linguistic elements 132 to a complexity categorization 140 based on the syntactic complexity. In one or more embodiments, analyzing syntactic complexity may include parsing sentence structures to identify linguistic features such as the number of subordinate clauses, depth of syntactic trees, noun phrase complexity, and average sentence length. In one or more embodiments, a natural language parser may be used to compute a syntactic complexity score by evaluating syntactic features including, but not limited to, clause length, frequency of passive constructions, presence of relative clauses, embedded phrases, coordination structures, or recursive syntactic patterns. At least a processor 104 may be further configured to generate a learning task corresponding to a linguistic level associated with the user associated data file 116, wherein the learning task is selected based on one or more learning parameters associated with the first linguistic level 144 or the second linguistic level 148. A "linguistic element," as used in this disclosure, is any units of natural language. In one or more embodiments, a plurality of linguistic elements 132 may include individual words, phrases, idiomatic expressions, grammatical structures, or semantic constructs extracted from the user associated data file 116. In one or more embodiments, a classification process may use the processor 104 to parse a user associated data file 116 to extract linguistics elements and analyze each element to determine its corresponding complexity level. In one or more embodiments, complexity categorizations 140 may be determined based on syntactic structure, semantic depth, lexical frequency, or cognitive demand. For example, and without limitation, high-complexity phrases may include abstract metaphors or advanced academic terminology. Low-complexity elements may include high-frequency everyday words or simple declarative structures. In one or more embodiments, the classification may be performed using a trained machine learning model such as a transformer-based neural network (e.g., BERT or RoBERTa), a support vector machine (SVM), or a rule-based decision tree trained on annotated corpora of reading-level data. In one or more embodiments, a machine learning model may assign each linguistic element to a category within the complexity categorizations 140, such as beginner, intermediate, or advanced, and may further generate a complexity score based on the distribution and density of categorized elements. This score may represent an overall readability level or linguistic proficiency threshold associated with the user associated data file 116. In one or more embodiments, classification results may be used to personalize the learning task by modifying the identified linguistic elements 132 according to the user's linguistic profile. For example, and without limitation, advanced-level expressions may be replaced with simpler equivalents if a user is determined to be at a beginner or intermediate level. For example, and without limitation, simpler elements may be replaced with more sophisticated learning task to challenge an advanced learner.

With continued reference to FIG. 1, in one or more embodiments, a first linguistic level 144 may correspond to a basic or beginner language complexity, which may be characterized by simple vocabulary, short sentence structures, and concrete, literal expressions. In one or more embodiments, a second linguistic level 148 may correspond to an advanced linguistic complexity, which may be characterized by sophisticated vocabulary, compound or complex sentence constructions, figurative language, or domain-specific terminology.

With continued reference to FIG. 1, in one or more embodiments, a machine learning module 152 may evaluate features such as word frequency, sentence length, syntactic depth, party-of-speech patterns, or semantic ambiguity to assign each linguistic element to a corresponding complexity categorization. A "complexity categorization," as used in this disclosure, is a classification scheme that groups linguistic elements 132 based on their relative difficulty demand. In one or more embodiments, a plurality of complexity categorization may include difficulty demand that contains lexical, syntactic, semantic, or contextual complexity. For example and without limitation, if the user associated data file 116 include a paragraph from a literary novel containing the phrase "He meandered through the labyrinthine corridors of the dilapidated estate," the machine learning module 152 may identify "meandered," "labyrinthine," and "dilapidated" as high-complexity vocabulary elements, categorizing them at a second linguistic level 148. For example, and without limitation, if the user's linguistic profile indicates a beginner-level reader, apparatus may modify these elements to lower complexity alternatives, resulting in a modified version such as "He walked through the long, broken hallways of the old house." In one or more embodiments, modification of sentence may enhance readability and comprehension by aligning linguistic difficulty with a user associated data file 116. In one or more embodiments, for users identified as advanced readers, apparatus may perform an inverse transformation by replacing basic language elements with more complex equivalents to increase cognitive challenge and promote vocabulary expansion. For example, and without limitations, a phrase "The boy ran fast" may be enhanced to "The youth sprinted with urgency" if linguistic profile 128 and learning goal indicate that a suer is seeking enrichment in academic or literary language.

With continued reference to FIG. 1, in one or more embodiments, apparatus may selectively modify linguistic elements 132 whose complexity level deviates significantly from a user's proficiency range or learning objective. In one or more embodiments, selective modification of linguistic elements 132 may allow for dynamic tailoring while preserving a core structure and intent of an original content. In one or more embodiments, modifying the user associated data file 116 may include generating one or more questions, one or more writing prompts or one or more outline as a function of the linguistic profile. In one or more embodiments, a plurality of complex categorizations may be aligned with external standards such as school assigned grade levels, readability scores, or custom-defined curriculum tiers. In one or more embodiments, apparatus 100 may identify a distribution of linguistic elements 132 classified based on first linguistic level 144 and second linguistic level 148 and compare the distribution to a target linguistic range associated with a user's proficiency level that may be derived from a linguistic profile 128. For example, without limitation, linguistic elements 132 exceeding a user's linguistic level may be flagged for modification. In one or more embodiments, a modification process may include identifying groups of linguistic elements 132 assigned to a second linguistic level 148 and systematically replacing, rephrasing, or simplifying them to match a first linguistic level 144. For example, and without limitation, an idiomatic phrase or technical term may be reworded into a more literal or commonly used equivalent. For example, and without limitation, a user profile 114 with more advanced learning profile may require phrasing simpler instructions to a more academic or discipline-specific terminology. In one or more embodiments, a modification may be context sensitive. For example, and without limitation, a complex term like "photosynthesis" may be preserved in a first linguistic level 144 if it is central to a learning task, but the surrounding sentence structure and supporting vocabulary may be simplified to scaffold understanding. In one or more embodiments, apparatus may annotate, or supplement modified content with glossier, tooltips, or contextual explanations based on an identified linguistic elements 132 and a user's real-time interaction pattern. In one or more embodiments, modifications may include content generation processes. For example, and without limitation, apparatus 100 may generate derivative educational materials based on the modified user associated data file 116, such as simplified summaries, guided reading questions, vocabulary flashcards, contextual glossaries, essay prompts, or quizzes tailored to the modified content.

With continued reference to FIG. 1, in a non-limiting example, machine learning models may be consistent with one or more aspects of the machine learning models described in U.S. patent application Ser. No. 18/381,034, filed on Oct. 17, 2023, titled "APPARATUS AND METHOD FOR PERSONALIZATION OF MACHINE LEARNING MODELS," which is incorporated by reference herein in its entirety.

With continued reference to FIG. 1, in a non-limiting example, the machine learning models may be consistent with one or more aspects of the machine learning models described in U.S. patent application Ser. No. 19/043,876, filed on Feb. 3, 2025, titled "APPARATUS AND METHOD FOR PERSONALIZATION OF MACHINE LEARNING MODELS," which is incorporated by reference herein in its entirety.

With continued reference to FIG. 1, in a non-limiting example, the machine learning models may be consistent with one or more aspects of the machine learning models described in U.S. patent application Ser. No. 19/044,019, filed on Feb. 3, 2025, titled "APPARATUS AND METHOD FOR PERSONALIZATION OF MACHINE LEARNING MODELS," which is incorporated by reference herein in its entirety.

With continued reference to FIG. 1, processor 104 is configured to modify a graphical user interface 156 that includes one or more display elements associated with the modified user associated data file. A "graphical user interface," as used herein, is a graphical form of user interface that allows users to interact with electronic devices. In some embodiments, GUI 156 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. In an embodiment, the graphical user interface 156 and an event handler may operate together to enable seamless interaction between the user and the apparatus. A GUI 156 serves as a visual and interactive layer through which the user engages with the apparatus, presenting elements such as buttons, sliders, input fields, and informational displays. The event handler, on the other hand, functions as the underlying mechanism that monitors and responds to user interactions with a GUI 156. For example, when a user clicks a button on a GUI 156 to request an explanation of a concept, the event handler may detect the click event, identify its context, and trigger the appropriate processes within the apparatus to generate a tailored response. This interplay may ensure dynamic and responsive system behavior, as the event handler processes various input events such as clicks, taps, keystrokes, or voice commands, and relays these inputs to the relevant system components. A GUI 156 subsequently updates to reflect the system's responses, such as displaying user specific output, modifying visual elements, or providing real-time feedback. Together, a GUI 156 and event handler create an intuitive and interactive experience, bridging user actions and system functionality to achieve efficient and personalized outcomes.

With continued reference to FIG. 1, a natural language processing (NLP) model 136 may be configured to update a linguistic profile 128 in real time based on a user's interaction with a graphical user interface. In one or more embodiments, a graphical user interface 156 may enable a range of user interactions, including but not limited to, text input, spoken commands, selection of highlighted elements, or navigation patterns, which may serve as actional signals for refining a user's linguistic profile 128. For example, and without limitation, if a user frequently clicks on vocabulary tooltips or requests simplified definitions via GUI-based buttons adjacent to advanced terms, an NPL model may interpret such behavior as indicative of limited familiarity with high-complexity vocabulary and may adjust a user's vocabulary proficiency score within a linguistic profile 128. In one or more embodiments, an NLP model 136 may monitor user-generated textual input through GUI 156 components such as writing prompts, fill-in-the-blank exercise, or short-answer field. In one or more embodiments, an NLP model 136 may extract linguistic identifiers from the responses (e.g., grammar usage, sentence complexity, semantic relevant) and update a linguistic profile 128 in real time to reflect a user's evolving language skills. For example, without limitation, if a user begins to use more complex sentence structures or domain-specific terminology in their writing over time, apparatus may elevate a user's classification from a first linguistic level 144 to a second linguistic level 148. In one or more embodiments, voice-based interaction within a GUI 156, including but not limited to, read-aloud practice or spoken queries may be processed through speech recognition components and analyzed for fluency, pronunciation accuracy or phonetic variance, In one or more embodiments, deviations from target models may signal pronunciation deficiencies and promote a NLP model 136 to appended updated speech performance indicators to a linguistic profile 128. In one or more embodiments, updated linguistic profile may influence subsequent content selection, and GUI 156 element presentation. In one or more embodiments, a user interaction may be captured via GUI 156. For example, and without limitation, user interaction may include textual, auditory and behavioral. In one or more embodiments, user interaction may be recorded as part of a cumulative interaction history and stored within or associated with a linguistic profile 128. In one or more embodiments, cumulative interaction history may be used to reassess a user's linguistic complexity level by reclassifying a user according to a updated metrics derived from user interactions. For example, and without limitation, a NLP model 136 may use new patterns of usage indicating whether a user is struggling with specific linguistic feature, the NLP model 136 may adjust a user's proficiency boundaries. In one or more embodiments, adjustments of proficiency boundaries may result in a revised complexity level categorization, which in turn may influence a selection and presentation of subsequent educational content.

With continued reference to FIG. 1, in a non-limiting example, the graphical user interface 156 may be consistent with one or more aspects of the graphical user interface 156 as described in U.S. patent application Ser. No. 19/044,241, filed on Feb. 3, 2025, titled "APPARATUS AND METHOD FOR GENERATING A LEARNING ENVIRONMENT COMPRISING AN INTERACTIVE, MULTI-WINDOW GRAPHICAL USER INTERFACE," which is incorporated by reference herein in its entirety.

With continued reference to FIG. 1, processor 104 is configured to transmit a graphical user interface 156 to a remote device 160. As used in this disclosure, "remote device 160," is a device that accesses and interacts with apparatus. In a non-limiting embodiment, remote device 160 may be consistent with a computing device as described in the entirety of this disclosure. Without limitation, the remote device 160 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as textural, graphical, video among others, in either monochrome or color. Display device may include, but are not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI 156. In some cases, a user may view a GUI 156 through display. Additionally, or alternatively, processor 104 be connected to display device.

With continued reference to FIG. 1, apparatus 100 may include an evaluation model 164. In one or more embodiments, at least a processor 104 may be further configured to compare, using the evaluation model 164, historical input data 168 to future learning status 172. In one or more embodiments, at least a processor 104 may be further configured to determine, using a comparison of the historical input data 168 to the future learning status 172, target learning status 176. A "target learning status," as used in this disclosure, is a defined goal state of user learning performance or proficiency. In one or more embodiments, a target learning status 172 may include intended or recommended cognitive, behavioral, or knowledge-based outcomes. In one or more embodiments, at least a processor 104 may be further configured to generate a learning score 180 as a function of a difference between the historical input data 168 and the target learning status 176. In one or more embodiments, at least a processor 104 may be further configured to and iteratively train the Natural language processing (NLP)

model 136 using the learning score 180. As used in this disclosure, an "evaluation model" is a computational framework, algorithm, or set of criteria designed to assess, analyze, or measure the quality, effectiveness, or performance of a system. The evaluation model 164 may process input data 112, such as user feedback, system metrics, or contextual factors, and generate results or scores that inform decision-making, optimization, and improvement efforts. For example, without limitation, the evaluation model 164 may assess the effectiveness of a user specific output, such as a tailored explanation, by analyzing user feedback, comprehension scores, or interaction data. The evaluation model 164 may include parameters such as clarity, relevance, user engagement, and success outcome. Continuing, based on this analysis, the evaluation model 164 may recommend adjustments to improve future outputs or update user profile 114. The evaluation model 164 may leverage techniques such as machine learning, statistical analysis, or rule-based algorithms to ensure accurate and context-sensitive assessments. As used in this disclosure, "historical input data" are categorizations or labels assigned to past input data. Without limitation, the historical input data 168 may be derived from analyzing historical data and are used to identify patterns, trends, or attributes relevant to the user or the system's operations. Historical input data 168 may include categories such as user preferences, skill levels, learning styles, or frequently accessed content. For example, without limitation, historical input data 168 may indicate that a user has consistently preferred visual learning aids or has been categorized as a beginner in mathematics based on past interactions. The historical input data 168 may be used to inform the generation of user specific outputs, updates to the user profile 114, or predictive modeling for future interactions. As used in this disclosure, "future learning status" is subsequent actions, behaviors, or interactions of a user or system. Future learning status 172 may include tasks, processes, or engagements that the system collects and analyses to optimize the user experience or achieve specific objectives. For example, future learning status 172 may include the user completing a sequence of learning content tailored to their preferences or skill level, such as progressing to advanced vocabulary after finishing basic vocabulary. The future learning status 172 may include subsequent actions that are part of the user's interaction within the system and contribute to their learning journey. In another example, future learning status 172 may involve the user participating in scheduled writing task or engaging with reading prompt problems provided by the system. If the user tends to explore additional resources after completing a lesson, future learning status 172 may include reviewing supplementary reading materials or revisiting earlier content for reinforcement.

In one or more embodiments, an "iterative training," as used in this disclosure, is any cyclical process in which an NLP model 136 is progressively updated based on accumulated performance metrics to enhance personalization. A "learning score," as used in this disclosure, is a quantified difference between historical input data 168 and a target learning status 176. In one or more embodiments, if a user's historical input data 168 indicates repeated difficulty with abstract vocabulary, and a future learning status 172 reveals improved performance following simplification, a learning score 180 may encode a magnitude of improvement and be applied to adjust a model's weighting for future content simplification tasks. In one or more embodiments, a processor 104 may accumulate learning score 180 across multiple sessions and users to retrain an NLP model 136 in batch and refine model's ability to generate user-specific outputs across diverse learning profiles and educational contexts.

With continued reference to FIG. 1, apparatus 100 may include a chatbot. As used in this disclosure, a "chatbot" is a program designed to simulate human-like conversations and interactions with users through text or voice-based communication interfaces. The chatbot may use natural language processing to understand the user input, generate custom responses, and perform tasks based on the plurality of user queries or commands. To engage younger users, the chatbot may also provide visual aids, such as diagrams of triangles, and incorporate gamified elements, like quizzes or badges, to encourage learning. In another non-limiting example, a high school student preparing for the SAT may use the chatbot to practice vocabulary or critical reading skills. The student may ask, "What does the word 'mitigate' mean?" and the chatbot may define the term, provide synonyms, and/or use it in a sentence. Continuing, to support learning retention, the chatbot may generate multiple-choice questions or short quizzes on related vocabulary. For more advanced assistance, the chatbot may analyze the student's incorrect answers from previous sessions and tailor new questions to address their weak areas, ensuring a personalized learning experience. For students with learning differences, the chatbot may adapt its responses, such as using simpler language or providing audio explanations for visual learners. In another non-limiting example, the chatbot may assist a law student preparing for an exam on constitutional law. The student may ask complex questions, such as "Can you explain the principles established in Marbury v. Madison?" The chatbot may provide a detailed summary of the case, its historical significance, and/or its role in establishing judicial review. For students with accessibility needs, such as a hearing impairment, the chatbot may offer written transcripts of audio resources or provide additional resources, like video lectures with closed captions. Regardless of the student's age, demographic, or education level, the chatbot may dynamically adapt its outputs to align with the user's topic, preferred learning style, and knowledge level, making it a versatile and inclusive educational tool.

With continued reference to FIG. 1, In one or more embodiments, input data 112 may allow the chatbot to generate tailored responses, such as providing simplified explanations for a younger user, offering advanced resources for a law student, or delivering closed captions for a user with hearing impairments. Continuing, by leveraging input data 112, the chatbot may ensure a more relevant, effective, and personalized user experience. As used in this disclosure, "sentiment data" is information derived from an analysis of a user's emotional tone, attitude, or mood. The sentiment data may be extracted from text, voice, or other multimodal inputs of the user input and may be generated using natural language processing techniques, tone analysis, or behavioral analysis. Sentiment data may indicate whether a user is expressing emotions such as frustration, joy, confidence, confusion, and the like, and may allow the chatbot to adapt the custom responses accordingly. In a non-limiting example, sentiment data may be identified from a user's typed query, such as "I don't understand this topic at all," which may indicate frustration or a need for simpler explanations. The chatbot may analyze vocal inputs for tone, such as a rising pitch or hesitancy, which may suggest uncertainty. Continuing, by leveraging sentiment data, the chatbot may provide more empathetic and supportive responses tailored to the user's emotional state, such as offering encouragement, simplifying content, or providing additional resources. As used in this disclosure, "custom response" is an output generated by the chatbot that is uniquely tailored to a user's input. Without limitation, the custom response may be designed to address the user's needs in a personalized and relevant manner by incorporating input data 112, sentiment data, or situational context. Custom responses may vary in content, tone, or delivery format depending on the user's requirements and/or interaction history. In a non-limiting example, the custom response for a user preparing for the Bar Exam may include a step-by-step explanation of a complex legal concept, accompanied by suggested case law references and practice questions. If sentiment data indicates the user is struggling, the chatbot may adapt its tone to provide reassurance, such as, "This topic can be challenging, but you're doing great, here's a simplified breakdown to help." Additionally, and or alternatively, for users with accessibility needs, the custom response may include closed captions, visual aids, and/or alternative formats to ensure inclusivity. Without limitation, by generating custom responses, the chatbot may enhance user engagement, efficiency, and overall experience.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

Figure 2:
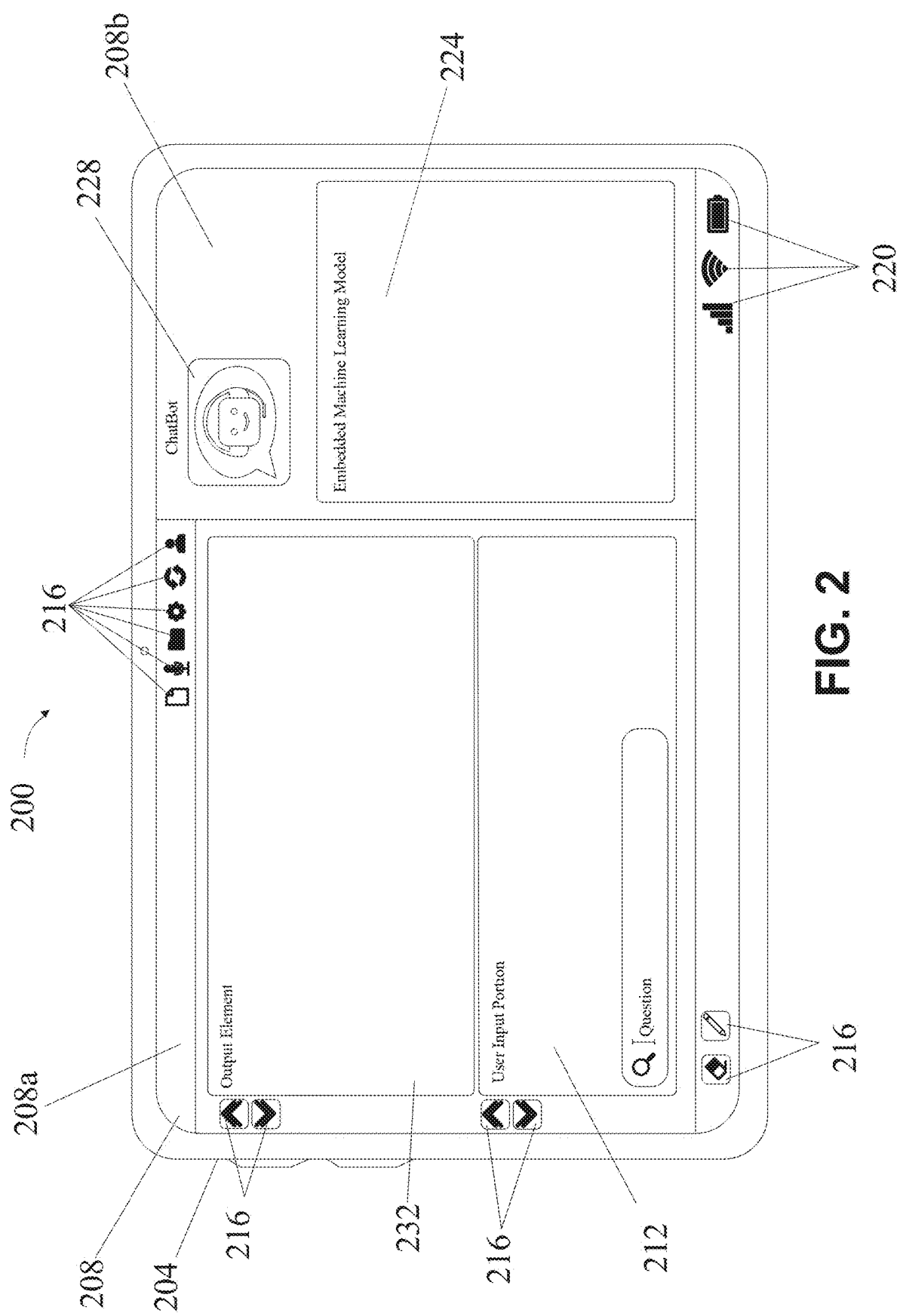
FIG. 2 is an exemplary illustration of a graphical user interface.

Referring now to FIG. 2, an exemplary illustration 200 of a graphical user interface is described. In an embodiment, the illustration 200 includes a downstream device 204. The downstream device 204 may serve as the hardware interface for delivering outputs generated by the apparatus. The downstream device 204 may include a tablet, smartphone, laptop, or other computing system capable of receiving data from the processor and presenting it to the user. The downstream device 204 may provide the primary platform for user interaction with the system.

With continued reference to FIG. 2, in an embodiment, the downstream device 204 includes a graphical user interface 208. The graphical user interface 208 may facilitate interactions between the user and the system. The GUI 208 may visually display content, enable inputs, and provide outputs in a manner that is user-friendly and intuitive. The GUI 208 may act as the gateway for engaging with the system's functionality. In an embodiment, the GUI 208 may include a first visual window 208*a*. In one or more embodiments, a first visual window 208*a* may be used to display user associated data file 116 including but not limited to text or digital book that a user is reading or learning from. In one or more embodiments, a first visual window 208*a* may be used to display original text without modifications from user associated data file 116. In an embodiment the GUI 208 may include a second visual window 208*b*. In one or more embodiments, GUI 208 may create a second visual window 208*b* alongside with a first visual window 208*a* to display modified linguistic elements generated to support a user's reading comprehension. For example and without limitation, modified linguistic elements may include simplified definitions, contextual explanations, or rephrased text. In one or more embodiments, a content displayed in a second visual window 208*b* may be adaptively updated in real time as a user progress through user associated data file in 116 a first visual window 208*a*. The first visual window 208*a* may display the output element 232 as described herein. The first visual window 208*a* may display the user input portion 212 as described below. The second visual window may display outputs generated by the machine learning model. The second visual window 208*b* may display the chatbot 228 as described herein.

With continued reference to FIG. 2, in an embodiment, the graphical user interface 208 includes a user input portion 212. The user input portion 212 may allow users to provide inputs, such as typing text, selecting options, or uploading files. For example, the user may input a query or select topics for test preparation through the user input portion 212 of the interface, initiating interaction with the apparatus.

With continued reference to FIG. 2, in an embodiment, the graphical user interface 208 includes one or more interactive elements 216. The one or more interactive elements 216 may include buttons, sliders, dropdown menus, and the like. The one or more interactive elements 216 may facilitate user actions like submitting responses, navigating between sections, or selecting specific features. For example, the one or more interactive elements 216 may allow users to toggle between question sets or customize the display preferences. In an embodiment, the interactive elements 216 may include arrow icons to reconfigure the user input portion 212 and/or the output element 232 as discussed in more detail below.

With continued reference to FIG. 2, in an embodiment, the graphical user interface 208 includes visual elements 220. The visual elements 220 may include icons, charts, images, animations, and the like. The visual elements 220 may enhance the user's understanding of the content. For instance, visual elements 220 may include graphical representations of data or illustrations accompanying test questions, providing a more engaging and comprehensive experience.

With continued reference to FIG. 2, in an embodiment, the graphical user interface 208 includes a response portion 224. The response portion 224 may display output generated by the apparatus. The response portion 224 may present tailored responses, such as answers to user queries, explanations of concepts, feedback on submitted responses, providing immediate and contextually relevant information. In an embodiment, the response portion 224 displays answers generated by the machine learning model.

With continued reference to FIG. 2, in an embodiment, the graphical user interface 208 includes a machine learning model. The machine learning model may operate behind the scenes to analyze inputs, generate outputs, and adapt responses based on user interactions. The machine learning model may refine its output over time, ensuring that the system remains responsive to the user's evolving needs and preferences. In an embodiment, the graphical user interface 208 may incorporate the machine learning model to deliver immediate and personalized feedback. For example, the system may analyze a user's incorrect response to a question and provide tailored hints or explanations based on patterns identified in similar mistakes. Continuing, the adaptive capability may help users address gaps in understanding and reinforce learning more effectively. The machine learning model may also dynamically adjust the difficulty level of questions presented to the user. For instance, if a user consistently answers intermediate-level questions correctly, the system may introduce more advanced material to challenge their skills. Conversely, if a user struggles with specific concepts, the system may provide simpler, foundational questions to build confidence and comprehension. In another example, the machine learning model may analyze the user's interaction history to recommend additional resources or practice materials. If the user shows repeated interest in topics like "calculus" or "contract law," the system may suggest further reading, interactive simulations, or quizzes that align with those interests, ensuring a highly targeted and personalized learning experience. Additionally, and or alternatively, the machine learning model may monitor user engagement data, such as the time spent on questions or skipped sections, to refine future outputs. For example, if a user frequently skips lengthy explanations, the system may summarize responses more concisely while still providing access to in-depth content when needed. This responsive approach ensures the system continuously adapts to the user's preferences and learning style.

With continued reference to FIG. 2, the machine learning model may be embedded alongside the questions and study materials, actively analyzing the content displayed in the first visual window 208a to provide immediate clarification and contextual insights. For instance, without limitation, if the first visual window 208a presents a test question on Newton's Laws of Motion, the second visual window 208b may dynamically generate an explanation of the relevant law, highlight key principles, and offer additional resources such as diagrams or real-world examples. Continuing, if the student interacts with the material, by selecting a term, highlighting a passage, or submitting an attempt at answering a question, the machine learning model may process that engagement and adjust its output in the second visual window 208b to provide tailored feedback. Without limitation, this may ensure that the user receives highly relevant assistance without needing to navigate away from their study session. In an embodiment, the machine learning model may leverage multiple data sources within the GUI 208, enhancing the learning experience by incorporating context-aware assistance. The machine learning model may analyze the personalized test preparation materials displayed in the first visual window 208a, recognize the user's responses to test questions, and even interpret notes, highlights, or annotations made by the user. For example, if a student highlights a section of a complex legal case in the study material, the machine learning model may interpret this selection and generate a summary, key takeaways, or comparisons to similar cases within the second visual window. Additionally, and or alternatively, if the student attempts to answer a practice question, the ML module may evaluate the response and offer targeted explanations, corrections, or hints to guide them toward the correct reasoning. Without limitation, this interactive and contextually responsive approach ensures that the apparatus adapts dynamically to the user's specific learning progress. Continuing, this configuration offers significant usability improvements over conventional learning platforms, where students typically need to search for explanations separately or reference external materials. Without limitation, by embedding the machine learning model directly within the GUI 208, the apparatus provides on-demand support that is immediately relevant to the user's study session, reducing the need for manual searching and improving overall comprehension. This seamless integration of AI-driven assistance within the learning interface enhances engagement, allowing users to receive instant clarifications that are directly aligned with the material they are studying. The result is a more efficient, personalized, and interactive learning process, ensuring that users can focus on mastering the subject matter with minimal disruptions.

With continued reference to FIG. 2, in an embodiment, the graphical user interface 208 includes an output element 232. In an embodiment, the output element may display content generated by the machine learning model. For example, without limitation, the output element 232 may display curated study materials, problem sets, or test questions tailored to the user's learning needs.

With continued reference to FIG. 2, in a non-limiting example, the graphical user interface may be consistent with one or more aspects of the graphical user interface as described in U.S. patent application Ser. No. 19/044,241, filed on Feb. 3, 2025, titled "APPARATUS AND METHOD FOR GENERATING A LEARNING ENVIRONMENT COMPRISING AN INTERACTIVE, MULTI-WINDOW GRAPHICAL USER INTERFACE," which is incorporated by reference herein in its entirety.

Figure 3:
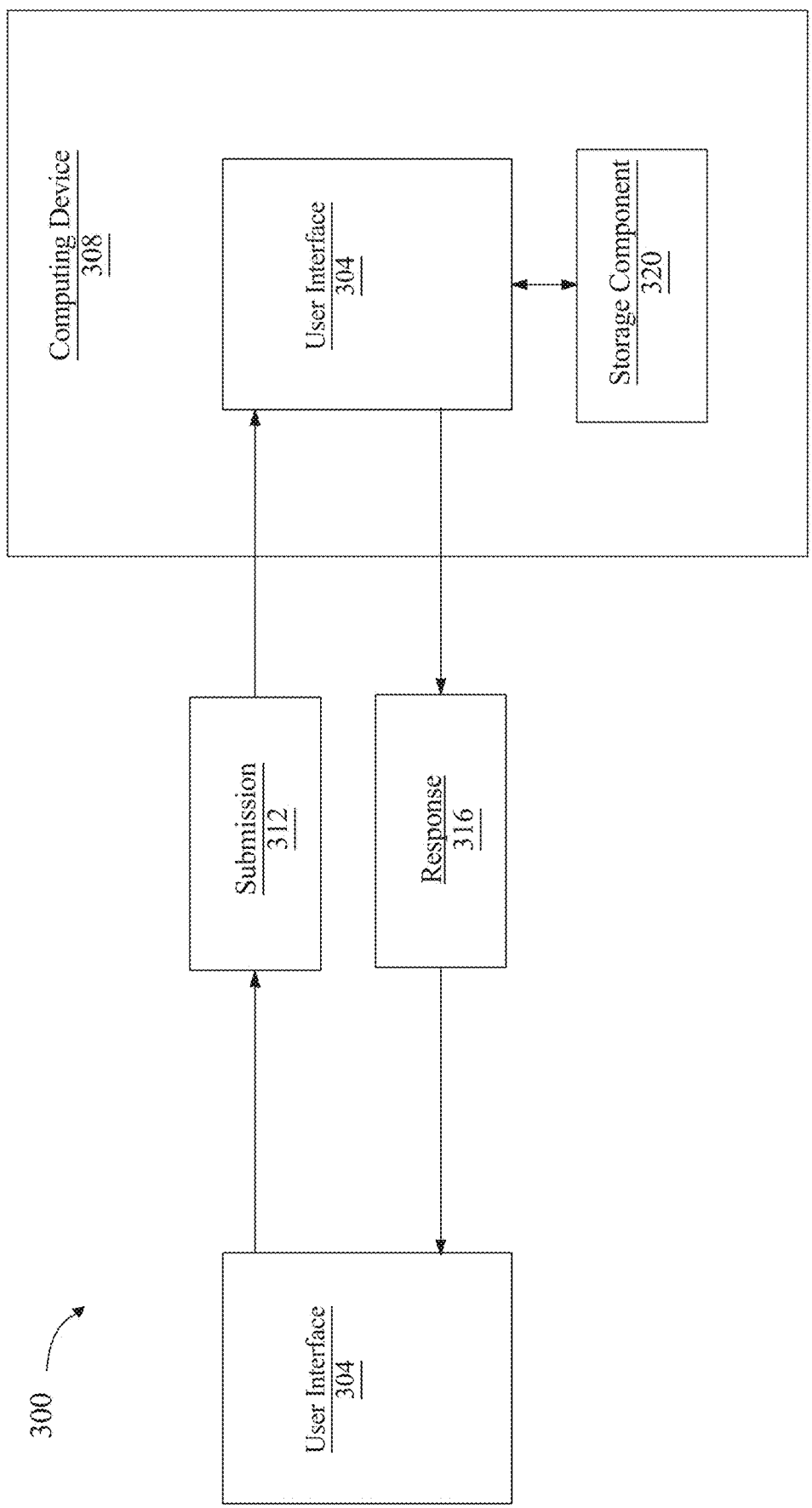
FIG. 3 is a diagram of an exemplary embodiment of a chatbot.

Referring now to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively, or additionally, in some cases, user interface 304 may remote to computing device 308 and communicative with the computing device 308, by way of one or more networks, such as without limitation the internet. Alternatively, or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both submission 312 and response 316 are text-based communication. Alternatively, or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively, or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry presents within submission 312 from a user interface 304 may be used by computing device as an input to another function.

With continued reference to FIG. 3, in a non-limiting example, the chatbot may be consistent with one or more aspects of the chatbot as described in U.S. patent application Ser. No. 19/044,241, filed on Feb. 3, 2025, titled "APPARATUS AND METHOD FOR GENERATING A LEARNING ENVIRONMENT COMPRISING AN INTERACTIVE, MULTI-WINDOW GRAPHICAL USER INTERFACE," which is incorporated by reference herein in its entirety.

Figure 4:
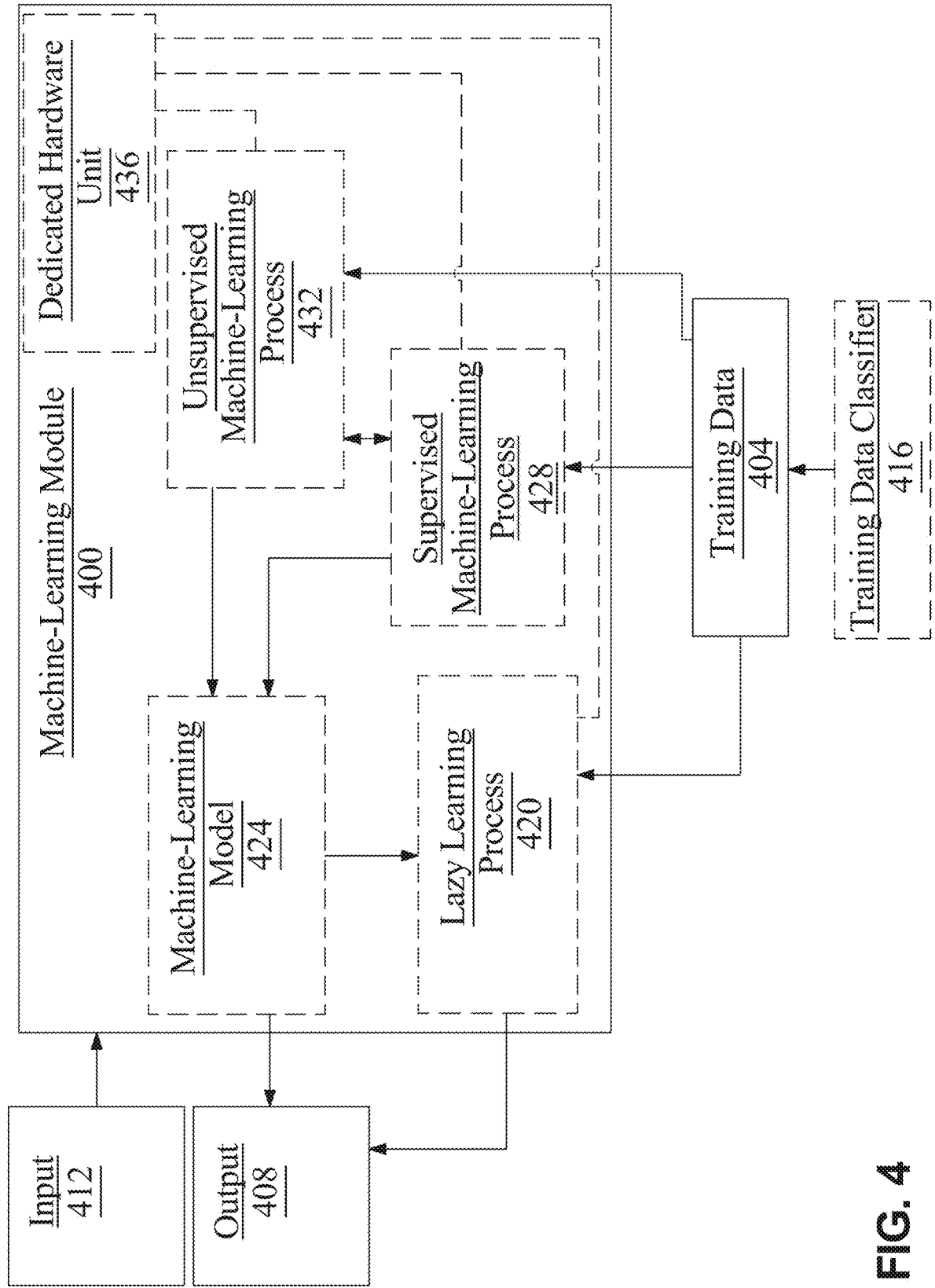
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs include input data and outputs include linguistic profile, at least one learning task.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories that characterize a sub-population, such as a cohort of learners grouped by linguistic level (e.g., beginner, or advanced) and/or other analyzed items and/or phenomena, such as preferred learning styles (e.g., visual, auditory, or kinesthetic) or subject areas (e.g., reading compression task, writing task, speech task), for which a subset of training data may be selected.

Still referring to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128 Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data as described above as inputs, linguistic profile, at least one learning task as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
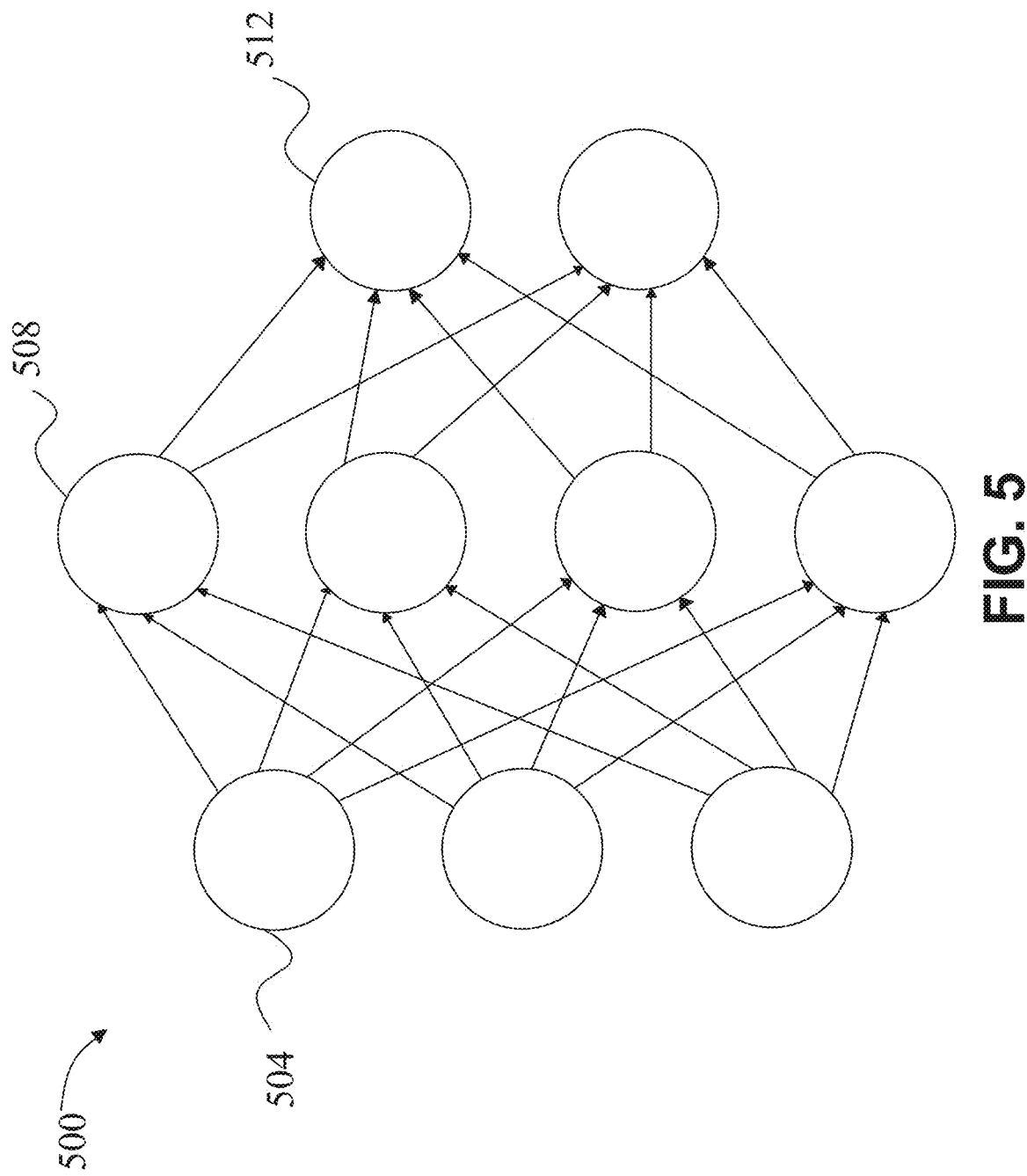
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
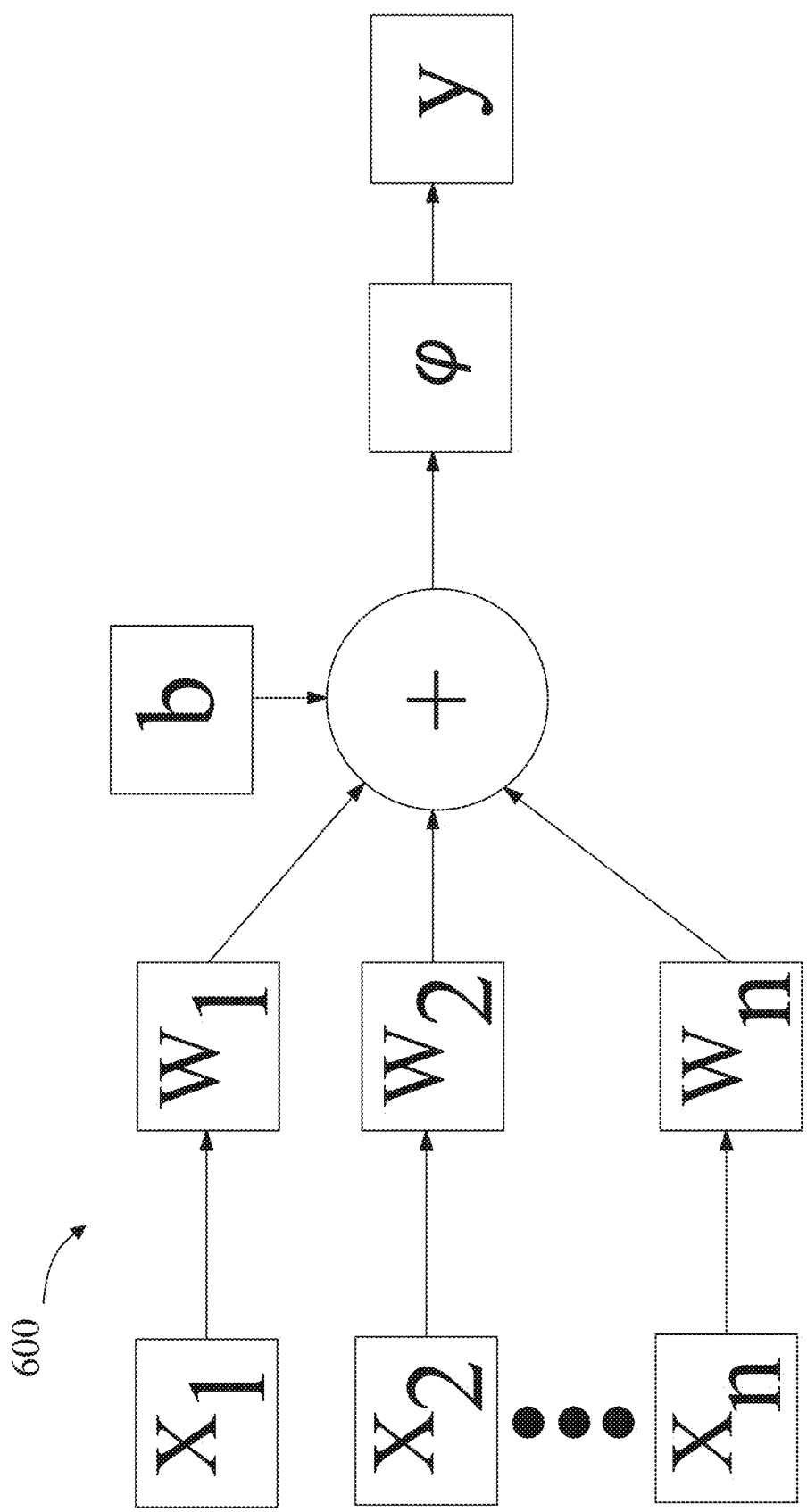
FIG. 6 is a diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input $x_i$ a tanh (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max (ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi} (x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w, that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 7:
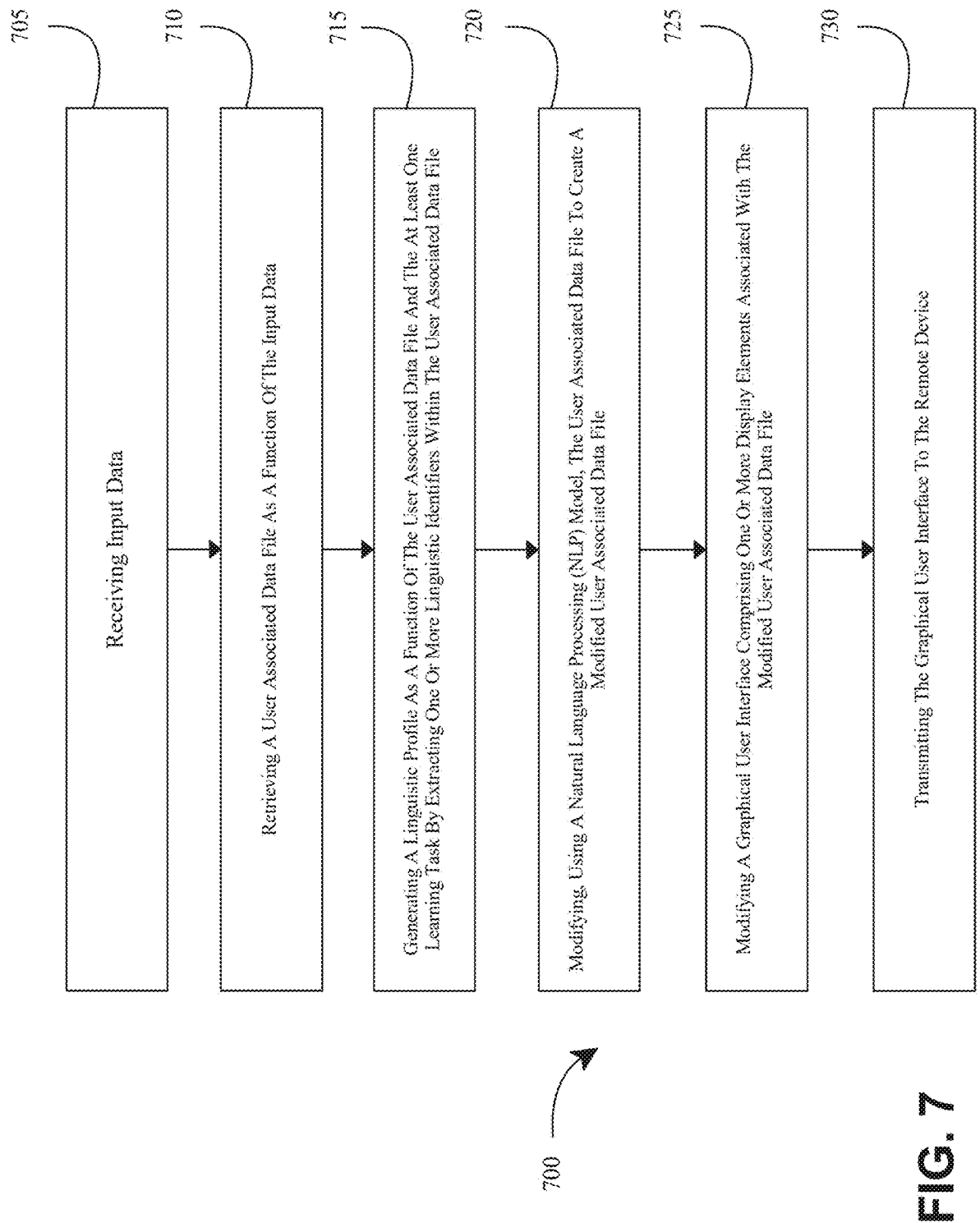
FIG. 7 is a block diagram of an exemplary method for adaptive content generation.

Referring now to FIG. 7, a flow diagram of an exemplary method 700 for adaptive content generation is illustrated. At step 705, method 700 includes receiving input data.

Still referring to FIG. 7, at step 710, method 700 includes retrieving a user associated data file as a function of the input data. This may be implemented as described and with reference to FIGS. 1-7.

Still referring to FIG. 7, at step 715, method 700 includes generating a linguistic profile as a function of the user associated data file and the at least one learning task by extracting one or more linguistic identifiers within the user associated data file. This may be implemented as described and with reference to FIGS. 1-7.

Still referring to FIG. 7, at step 720, method 700 includes modifying, using a natural language processing (NLP) model, the user associated data file to create a modified user associated data file, wherein modifying the user associated data file includes identifying, using a machine learning module, a plurality of linguistic elements within the user associated data file, classifying, using a machine learning module, the plurality of linguistic elements to a plurality of complexity categorizations, and modifying, using a machine learning module, one or more linguistic elements of the plurality of linguistic elements from one or more complexity categorizations of the plurality of complexity categorizations as a function of the linguistic profile In an embodiment, the plurality of complexity categorization may include a first linguistic level and a second linguistic level. This may be implemented as described and with reference to FIGS. 1-7.

Still referring to FIG. 7, at step 725, method 700 includes generating a graphical user interface comprising one or more display elements associated with the modified user associated data file. This may be implemented as described and with reference to FIGS. 1-7.

Still referring to FIG. 7, at step 730, method 700 includes transmitting the graphical user interface to the remote device. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
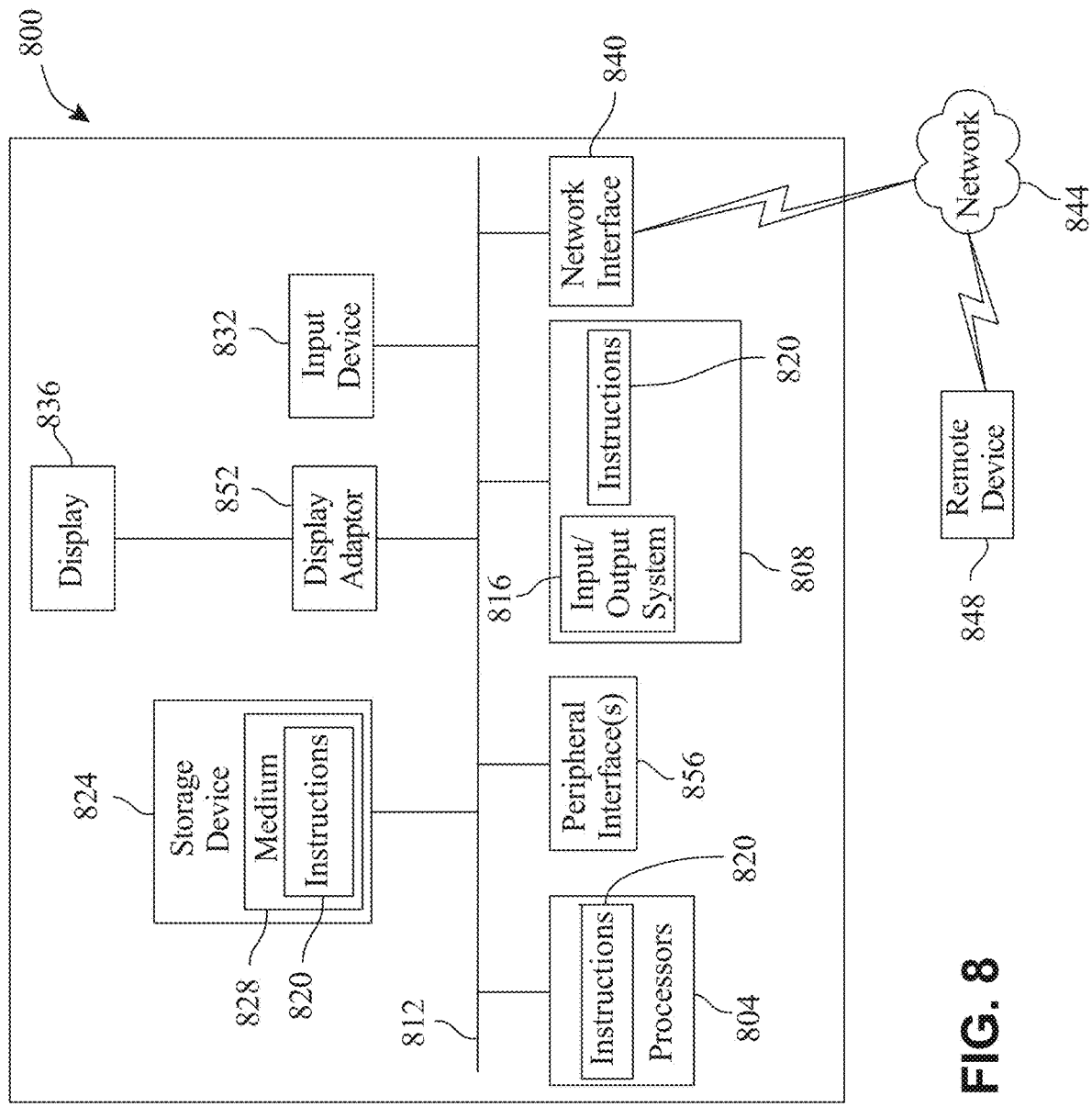
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicates with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware, and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:
1. An apparatus for adaptive content generation, wherein the apparatus comprises:
 circuitry, wherein the circuitry is configured to:
 receive input data;

retrieve a user associated data file as a function of the input data;

generate a linguistic profile as a function of the input data and at least one learning task by extracting one or more linguistic identifiers within the input data;

modify, using a natural language processing (NLP) model, the user associated data file to create a modified user associated data file as a function of the linguistic profile, wherein modifying the user associated data file comprises:

identifying, using a machine learning module, a plurality of linguistic elements within the user associated data file;

classifying, using the machine learning module, the plurality of linguistic elements to a plurality of complexity categorizations; and modifying, using the machine learning module, one or more linguistic elements of the plurality of linguistic elements from one or more complexity categorizations of the plurality of complexity categorizations as a function of the linguistic profile;

modify a graphical user interface comprising one or more display elements associated with the modified user associated data file wherein modifying the graphical user interface comprises:

identifying, using the machine learning module, the linguistic profile;

modifying, using the machine learning module, one or more linguistic elements of the plurality of linguistic elements as a function of the linguistic profile; and displaying, the modified one or more linguistic elements;

transmit the graphical user interface to a remote device.

2. The apparatus of claim 1, wherein generating the linguistic profile and the at least one learning task comprises:

classifying the input data to at the least one learning task of a plurality of learning tasks, wherein classifying the input data comprises:

identifying at least one deficiency element within the input data; and classifying the at least one deficiency element to the at least one learning task.

3. The apparatus of claim 1, wherein the graphical user interface creates a visual window based on the modified one or more linguistic elements, wherein the visual window is configured to display the modified one or more linguistic element as a function of the linguistic profile.

4. The apparatus of claim 1, wherein the circuitry is further configured to log a user interaction associated with the modified user associated data file, wherein logging the user interaction comprises capturing a user response time associated with the one or more display elements of the graphical user interface.

5. The apparatus of claim 1, wherein classifying the plurality of linguistic elements to a plurality of complexity categorizations comprises:

analyzing a syntactic complexity of each linguistic element of a plurality of linguistic elements within the user associated data file; and classifying each linguistic element of the plurality of linguistic elements to a complexity categorization based on the syntactic complexity.

6. The apparatus of claim 2, wherein identifying the at least one deficiency element comprises:

identifying one or more linguistic elements within the user associated data file;

comparing the one or more linguistic elements to one or more learning parameters;

determining a performance gap as a function of the at least one deficiency element; and identifying at least a learning task as a function of the performance gap.

7. The apparatus of claim 1, wherein the plurality of complexity categorizations comprises a first linguistic level and a second linguistic level, wherein the first linguistic level and the second linguistic level are associated with one or more learning parameters.

8. The apparatus of claim 7, wherein generating the linguistic profile comprises:

generating at least one learning task corresponding to a linguistic level associated with the user associated data file, wherein the learning task is selected based on the one or more learning parameters.

9. The apparatus of claim 1, wherein the Natural language processing (NLP) model is further configured to update the linguistic profile in real time based on a user's interaction with the graphical user interface.

10. The apparatus of claim 1, wherein:

the apparatus further comprises an evaluation model; and wherein the at least a processor is further configured to:

compare, using the evaluation model, historical input data comprising a plurality of input data received from previous iterations of the processing of apparatus, to a future learning status;

determine, using a comparison of the historical input data to the future learning status, a target learning status;

generate a learning score as a function of a difference between the historical input data and the target learning status; and iteratively train the Natural language processing (NLP) model using the learning score.

11. A method for adaptive content generation, the method comprising:

receiving, by circuitry, input data;

retrieving, by circuitry, a user associated data file as a function of the input data;

generating, by circuitry, a linguistic profile as a function of the input data and at least one learning task by extracting one or more linguistic identifiers within the input data;

modifying, using a natural language processing (NLP) model, the user associated data file to create a modified user associated data file as a function of the linguistic profile, wherein modifying the user associated data file comprises:

identifying, using a machine learning module, a plurality of linguistic elements within the user associated data file;

classifying, using the machine learning module, the plurality of linguistic elements to a plurality of complexity categorizations; and modifying, using the machine learning module, one or more linguistic elements of the plurality of linguistic elements from one or more complexity categorizations of the plurality of complexity categorizations as a function of the linguistic profile;

modifying, by circuitry, a graphical user interface comprising one or more display elements associated with the modified user associated data file wherein modifying the graphical user interface comprises:

identifying, using the machine learning module, the linguistic profile;

modifying, using the machine learning module, one or more linguistic elements of the plurality of linguistic elements as a function of the linguistic profile; and displaying, the modified one or more linguistic elements;

transmitting, by circuitry, the graphical user interface to a remote device.

12. The method of claim 11, wherein generating the linguistic profile and the at least one learning task further comprises:

classify, by circuitry, the input data to at the least one learning task of a plurality of learning tasks, wherein classifying the input data comprises:

identifying, by circuitry, at least one deficiency element within the input data; and classifying, by circuitry, the at least one deficiency element to the at least one learning task.

13. The apparatus of claim 1, wherein the graphical user interface creates a visual window based on the modified one or more linguistic elements, wherein the visual window is configured to display the modified one or more linguistic element as a function of the linguistic profile.

14. The method of claim 11, wherein the method further comprises logging, by circuitry, a user interaction associated with the modified user associated data file, wherein logging the user interaction comprises capturing a user response time associated with the one or more display elements of the graphical user interface.

15. The method of claim 11, wherein classifying the plurality of linguistic elements to a plurality of complexity categorizations comprises:

analyzing a syntactic complexity of each linguistic element of a plurality of linguistic elements within the user associated data file; and classifying each linguistic element of the plurality of linguistic elements to a complexity categorization based on the syntactic complexity.

16. The method of claim 12, wherein identifying the at least one deficiency element comprises:

identifying one or more linguistic elements within the user associated data file;

comparing one or more linguistic elements to one or more learning parameters;

determining a performance gap as a function of the at least one deficiency element; and identifying at least a learning task as a function of the performance gap.

17. The method of claim 11, wherein the plurality of complexity categorizations comprises a first linguistic level and a second linguistic level, wherein the first linguistic level and the second linguistic level are associated with one or more learning parameters.

18. The method of claim 17, wherein the method further comprises generating, by the circuitry, at least one learning task corresponding to a linguistic level associated with the user associated data file, wherein the learning task is selected based on the one or more learning parameters.

19. The method of claim 11, wherein the Natural language processing (NLP) model is further configured to update the linguistic profile in real time based on a user's interaction with the graphical user interface.

20. The method of claim 11, wherein the method further comprises an evaluation model, wherein the at least a processor is further configured to:

compare, using the evaluation model, historical input data to a future learning status;

determine, using a comparison of the historical input data to the future learning status, a target learning status;

generate a learning score as a function of a difference between the historical input data and the target learning status; and iteratively train the Natural language processing (NLP) model using the learning score.

\* \* \* \* \*